US010767414B2

(12) United States Patent
Strycharske et al.

(10) Patent No.: US 10,767,414 B2
(45) Date of Patent: Sep. 8, 2020

(54) METHOD AND APPARATUS FOR CONVECTIVE SILL INSULATION

(75) Inventors: Peter Strycharske, Wausau, WI (US); Dale Wruck, Hatley, WI (US)

(73) Assignee: Oldcastle BuildingEnvelope, Inc., Plano, TX (US)

( * ) Notice: Subject to any disclaimer, the term of this patent is extended or adjusted under 35 U.S.C. 154(b) by 983 days.

(21) Appl. No.: 13/396,126

(22) Filed: Feb. 14, 2012

(65) Prior Publication Data

US 2012/0214397 A1 Aug. 23, 2012

Related U.S. Application Data

(60) Provisional application No. 61/443,747, filed on Feb. 17, 2011.

(51) Int. Cl.

| | |
|---|---|
| ***E06B 7/02*** | (2006.01) |
| ***B23P 19/04*** | (2006.01) |
| ***F24F 7/00*** | (2006.01) |
| ***E06B 3/263*** | (2006.01) |

(52) U.S. Cl.

CPC .. *E06B 3/26347* (2013.01); *E06B 2003/2633* (2013.01); *E06B 2003/26327* (2013.01); *E06B 2003/26352* (2013.01); *E06B 2003/26387* (2013.01); *F24F 2007/004* (2013.01); *Y10T 29/49826* (2015.01)

(58) Field of Classification Search

CPC .. E06B 3/263; E06B 3/26347; E06B 3/26338; E06B 2003/26327

USPC .......................................................... 454/195

See application file for complete search history.

(56) References Cited

U.S. PATENT DOCUMENTS

| | | | | |
|---|---|---|---|---|
| 2,082,209 A * | 6/1937 | Mason | E06B 7/26 | 454/214 |
| 2,798,578 A * | 7/1957 | Toth | E06B 3/26347 | 49/406 |
| 3,389,527 A * | 6/1968 | Collard | 52/844 | |
| 3,452,498 A * | 7/1969 | Kinsey | E04B 1/0007 | 52/262 |
| 3,892,261 A | 7/1975 | Hoeman | | |
| 4,117,640 A * | 10/1978 | Vanderstar | E06B 3/26338 | 49/DIG. 1 |
| 4,164,830 A * | 8/1979 | Bierlich | 52/204.593 | |
| 4,198,796 A | 4/1980 | Foster | | |

(Continued)

FOREIGN PATENT DOCUMENTS

| | | | |
|---|---|---|---|
| DE | 102008063057 A1 * | 6/2010 | E06B 3/26303 |
| EP | 0043979 A1 * | 1/1982 | E06B 3/2632 |

(Continued)

*Primary Examiner* — Edelmira Bosques
*Assistant Examiner* — Phillip Decker
(74) *Attorney, Agent, or Firm* — Winstead PC

(57) ABSTRACT

The present application relates to an arrangement for reducing thermal energy loss through a sill assembly of the type used with a door or window. The sill assembly includes at least one sill member. The at least one sill member has a hollow region therein. The sill assembly further includes a baffle disposed within the at least one sill member. The baffle spans a length of the at least one sill member and divides the at least one sill member into a plurality of chambers thereby limiting interaction of warmer air and cooler air within the at least one sill member. The baffle reduces heat transfer through the hollow region via convection.

14 Claims, 8 Drawing Sheets

(56) References Cited

U.S. PATENT DOCUMENTS

| | | | | | |
|---|---|---|---|---|---|
| 4,257,202 | A * | 3/1981 | Biro | E06B 3/26347 52/204.51 |
| 4,275,526 | A * | 6/1981 | Abramson | E06B 3/34 52/207 |
| 4,283,895 | A * | 8/1981 | Sukolics | E06B 3/26338 411/55 |
| 4,399,636 | A * | 8/1983 | Blackwell | E06B 3/26347 160/91 |
| 4,433,712 | A | 2/1984 | Mellon et al. | |
| 4,473,980 | A | 10/1984 | Foster | |
| 4,516,356 | A * | 5/1985 | Delman | 49/504 |
| 4,996,802 | A * | 3/1991 | Brown | 52/92.2 |
| 5,092,092 | A | 3/1992 | Kiekens et al. | |
| 5,408,784 | A * | 4/1995 | Wruck et al. | 49/489.1 |
| 5,727,356 | A * | 3/1998 | Ensinger | E06B 3/26303 49/DIG. 1 |
| 5,761,864 | A | 6/1998 | Nonoshita | |
| 5,943,825 | A * | 8/1999 | Procton | E06B 7/2312 49/469 |
| 6,035,596 | A * | 3/2000 | Brunnhofer | E06B 3/26303 49/DIG. 1 |
| 6,920,726 | B2 * | 7/2005 | Bielefeld | E06B 3/221 49/504 |
| 7,065,929 | B2 * | 6/2006 | Manzella | E06B 3/26347 52/204.1 |
| 7,127,865 | B2 * | 10/2006 | Douglas | 52/745.13 |
| 7,134,247 | B2 * | 11/2006 | Ting | E06B 3/4609 52/234 |
| 7,987,633 | B2 * | 8/2011 | Lenox | E06B 3/26303 49/504 |
| 9,382,748 | B2 * | 7/2016 | Manzella | E06B 3/2605 |
| 2002/0059759 | A1 * | 5/2002 | Bielefeld | E06B 3/221 52/204.1 |
| 2007/0161345 | A1 * | 7/2007 | Chato | 454/196 |
| 2008/0282627 | A1 * | 11/2008 | Lenox | E06B 7/205 52/204.63 |
| 2008/0282628 | A1 * | 11/2008 | Lenox | E06B 3/26303 52/204.63 |
| 2009/0199486 | A1 * | 8/2009 | Wernlund et al. | E06B 1/70 49/471 |
| 2010/0146893 | A1 | 6/2010 | Dickinson | |
| 2010/0319843 | A1 * | 12/2010 | Wust | E06B 3/221 156/244.13 |
| 2011/0283625 | A1 * | 11/2011 | Lenox | E06B 3/26303 49/425 |
| 2014/0053488 | A1 * | 2/2014 | Lenox | E06B 3/26303 52/404.1 |

FOREIGN PATENT DOCUMENTS

| | | | | |
|---|---|---|---|---|
| FR | 2922249 | A1 * | 4/2009 | E06B 3/26347 |
| GB | 469098 | A * | 7/1937 | E04C 2/34 |
| GB | 2125865 | A * | 3/1984 | E06B 1/702 |
| GB | 2280216 | A * | 1/1995 | E06B 1/702 |
| GB | 2472473 | A * | 2/2011 | E06B 3/263 |
| JP | 2012136176 | A * | 12/2010 | |

* cited by examiner

METHOD AND APPARATUS FOR CONVECTIVE SILL INSULATION

CROSS-REFERENCE TO RELATED APPLICATIONS

This application claims priority to, and incorporates by reference for any purpose the entire disclosure of, U.S. Provisional Patent Application No. 61/443,747, filed Feb. 17, 2011.

BACKGROUND

1. Field of the Invention

The present application relates to insulation methods and systems and more particularly, but not by way of limitation, to methods and systems for internal convective insulation of hollow sill components associated with, for example, doors and windows.

2. History of the Related Art

The trend of increasing prices for natural gas, electricity, and other heating fuels has made energy efficiency a high-profile issue. In buildings, thermal energy may be lost to the atmosphere through, for example, conduction, radiation, or convection. Conduction is a transfer of thermal energy between regions of matter due to a temperature gradient. Radiation is a transfer of thermal energy via electromagnetic waves. Convection takes place as a result of molecular movement, known as currents or convective looping, within fluids. A common mode of convection results from an inverse relationship between a fluid's density and temperature. Heating of a fluid results in a decrease in the fluid's density. Denser portions of the fluid fall while less dense portions of the fluid rise resulting in bulk fluid movement. Typically, such type of convection is referred to as "natural" or "free" convection. A common example of natural convection is a pot of boiling water in which hot (less dense) water at a bottom of the pot rises in plumes and cooler (more dense) water near a top of the pot sinks. The primary means of thermal energy loss across an un-insulated air-filled space is natural convection.

Thermal efficiency of building components is often expressed in terms of thermal resistance ("R-value") and thermal transmission ("U-factor"). R-value, a measurement of thermal conductivity, measures a product's resistance to thermal energy loss. In common usage, R-value is used to rate building materials that generally do not transfer significant amounts of thermal energy by convection or radiation such as, for example, insulation, walls, ceilings, and roofs. A product with a higher R-value is generally considered to be more energy efficient.

In building insulation, of particular concern are windows and doors. Windows, in particular, come into contact with the environment in ways that walls and solid insulation do not. As a result, windows are strongly affected by convection as well as radiation. For this reason, U-factor is commonly used as a measure of energy efficiency of windows. U-factor measures a total rate of heat transfer through a product (including heat transfer via convection and radiation). A product with a lower U-factor is generally considered to be more energy efficient. In recent years, federal, state, and municipal building codes often specify minimum R-values and U-factors for building components.

Door and window assemblies of most buildings typically include one or more sill members. In most buildings, the sill members may be constructed from, for example, extruded materials having a hollow cavity therein. In moderate conditions, air contained in the hollow cavity often provides sufficient insulation to prevent thermal energy loss through the sill members via, for example, conduction, convection, or radiation. However, in conditions where there is a large temperature difference between an interior temperature and an exterior temperature, the large temperature difference may induce thermal currents in air contained in the hollow cavity making thermal energy loss via convection through the sill members significant.

In window and door assemblies, solid insulation such as, for example, foam or fiberglass has been used to reduce thermal energy loss through conduction and convection. However, solid insulation is not well suited for use in exterior door and window sill applications for a variety of reasons. First, installation of solid insulation throughout a sill member may prove difficult and time consuming. Second, infiltration of moisture into solid insulation materials often fosters growth of, for example, bacteria, fungus, and other contaminants. Such contaminants can cause unpleasant odors, aggravate allergies, and cause illness.

SUMMARY

In one embodiment, the present application relates to a sill assembly. The sill assembly may include at least one sill member. The sill assembly may include a baffle disposed within a hollow region of the at least one sill member. The baffle divides the hollow region into a plurality of chambers thereby limiting interaction of warmer air and cooler air within the at least one sill member. The baffle reduces heat transfer via convection through the hollow region.

In another embodiment, the present application relates to a method for insulating a sill member. The method may include providing at least one sill member having a groove disposed in a hollow region thereof. The method may include providing a baffle sized to be disposed within the hollow region of the at least one sill member and inserting the baffle into the groove. The method may include arranging the baffle such that the hollow region of the at least one sill member is divided into a plurality of chambers.

BRIEF DESCRIPTION OF THE DRAWINGS

A more complete understanding of the method and system of the present invention may be obtained by reference to the following Detailed Description when taken in conjunction with the accompanying drawings wherein.

DETAILED DESCRIPTION

Various embodiments of the present invention will now be described more fully with reference to the accompanying drawings. The invention may, however, be embodied in many different forms and should not be construed as limited to the embodiments set forth herein; rather, the embodiments are provided so that this disclosure will be thorough and complete, and will fully convey the scope of the invention to those skilled in the art.

Figure 1:
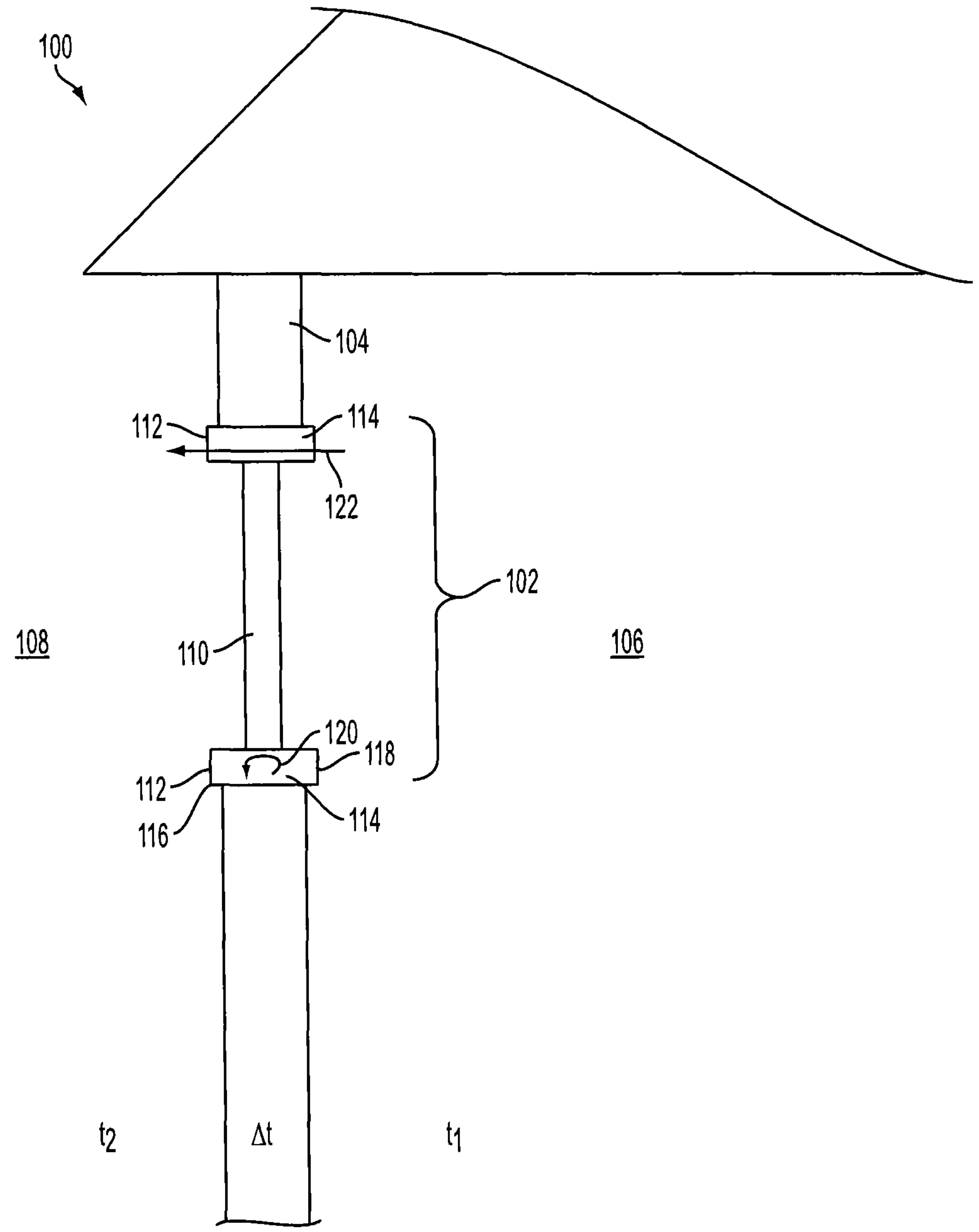
FIG. 1 PRIOR ART
FIG. 1 is a schematic block diagram of a building having a prior-art sill assembly.

FIG. 1 is a schematic block diagram of a building having a prior-art sill assembly. As used herein, the term "building" refers to any commercial or residential structure. A building 100 includes a window assembly 102 located in an exterior wall 104. The exterior wall 104 separates an interior region 106 of the building 100 from an exterior region 108. The window assembly 102 typically includes a pane 110 and at least one sill member 112. The at least one sill member 112 may be constructed from, for example, extruded aluminum or other similar material. The at least one sill member 112 typically includes a hollow region 114 located therein. The interior region 106 of the building is maintained at a first temperature $t_1$. Likewise, the exterior region 108 is typically at a second temperature $t_2$. A temperature gradient Δt arises as a result of a difference between the first temperature $t_1$ and the second temperature $t_2$. The relationship between the first temperature $t_1$, the second temperature $t_2$, and the temperature gradient Δt is shown mathematically by Equation I:

$$\Delta t = t_2 - t_1 \qquad \text{Equation I}$$

Still referring to FIG. 1, by way of further illustration, if the first temperature $t_1$ is assumed to be, for example, 72° F. and the second temperature $t_2$ is assumed to be, for example, −5° F., then the temperature gradient Δt is −77° F. In various embodiments, if the temperature gradient Δt is large, such as, for example, +/−70° F. or greater, an air temperature inside the hollow region 114 changes. By way of example, in the case illustrated above, air that is close in proximity to an exterior surface 116 of the at least one sill member 112 is gradually cooled and air that is close in proximity to an interior surface 118 of the at least one sill member 112 is gradually heated. The change in temperature of air inside the hollow region 114 causes an air density to change in accordance with the ideal gas law illustrated by Equation II $$\rho = \frac{p}{R \cdot T} \qquad \text{Equation II}$$

where ρ is air density, p is absolute air pressure, R is the specific gas constant, and T is absolute temperature. By way of example, the specific gas constant for dry air is generally known to be 287.058 J/(kgK). In accordance with the ideal gas law, the density of warmer air will decrease and the density of cooler air will increase.

Still referring to FIG. 1, as air temperature in the hollow region 114 changes, warmer, less dense air begins to rise while cooler, denser air begins to settle at a bottom region of the hollow region 114. This change in air density causes a circulation of air (illustrated in FIG. 1 with arrow 120) within the hollow region 114 resulting in heat transfer through the hollow region 114 via, for example, convection (illustrated in FIG. 1 with arrow 122).

Figure 2:
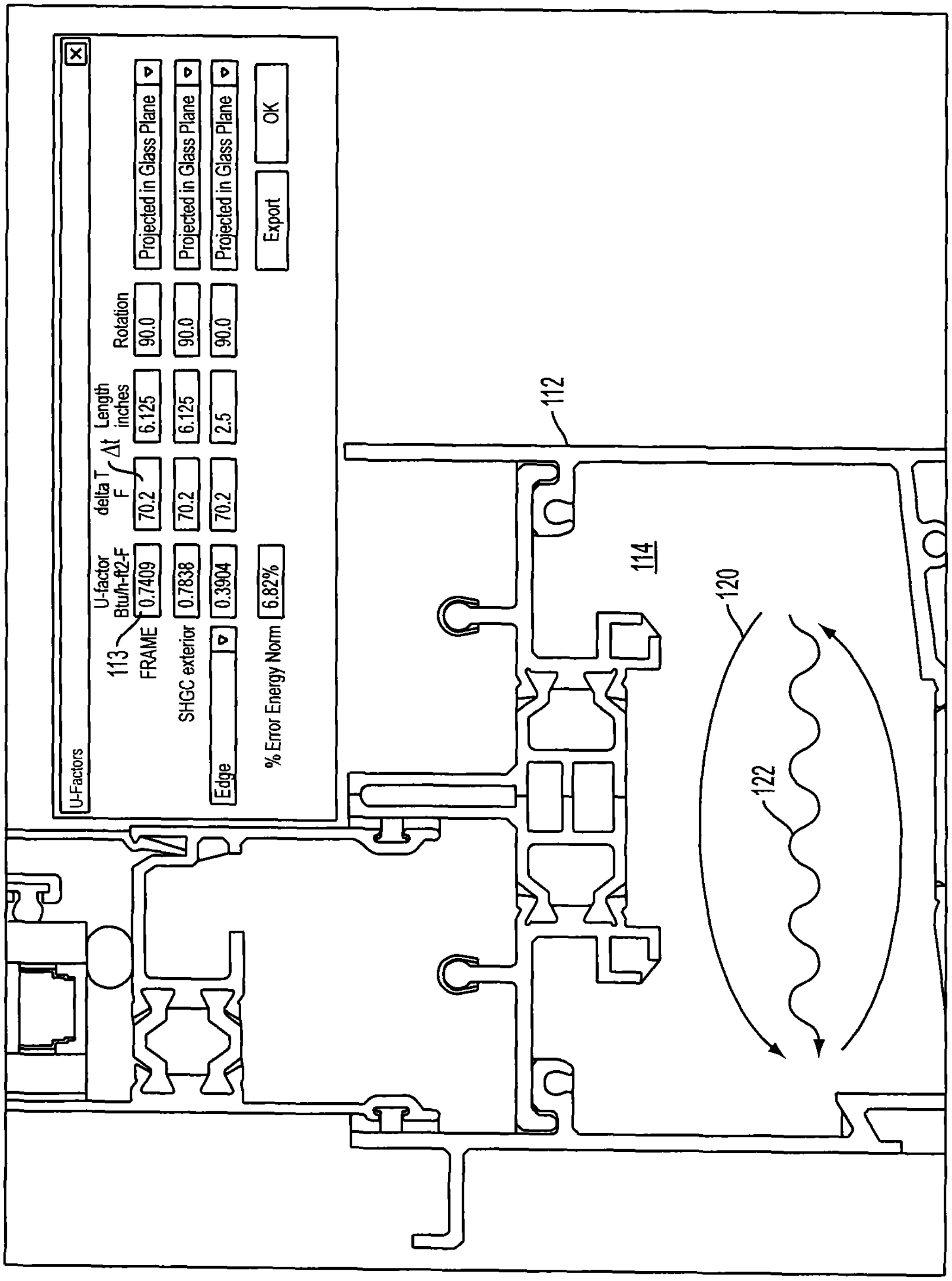
FIG. 2 PRIOR ART
FIG. 2 is cross-sectional view of a prior-art sill assembly illustrating heat transfer via convection therethrough.

FIG. 2 is a cross-sectional view of a prior-art sill assembly illustrating heat transfer via convection therethrough. A sill member 112, includes a hollow region 114 located therein. The hollow region 114 is typically filled with a fluid such as, for example, air. As discussed above with respect to FIG. 1, in situations where the temperature gradient Δt (shown in FIG. 1) is large, the air circulation 120 is induced enabling the heat transfer 122 through the hollow region 114 via, for example, convection. By way of example, FIG. 2 illustrates an exemplary temperature gradient Δt of 70.2° F. The arrangement shown in FIG. 2 yields an exemplary U-factor 113 of 0.7409 BTU/hr·ft$^2$·° F.

Figure 3:
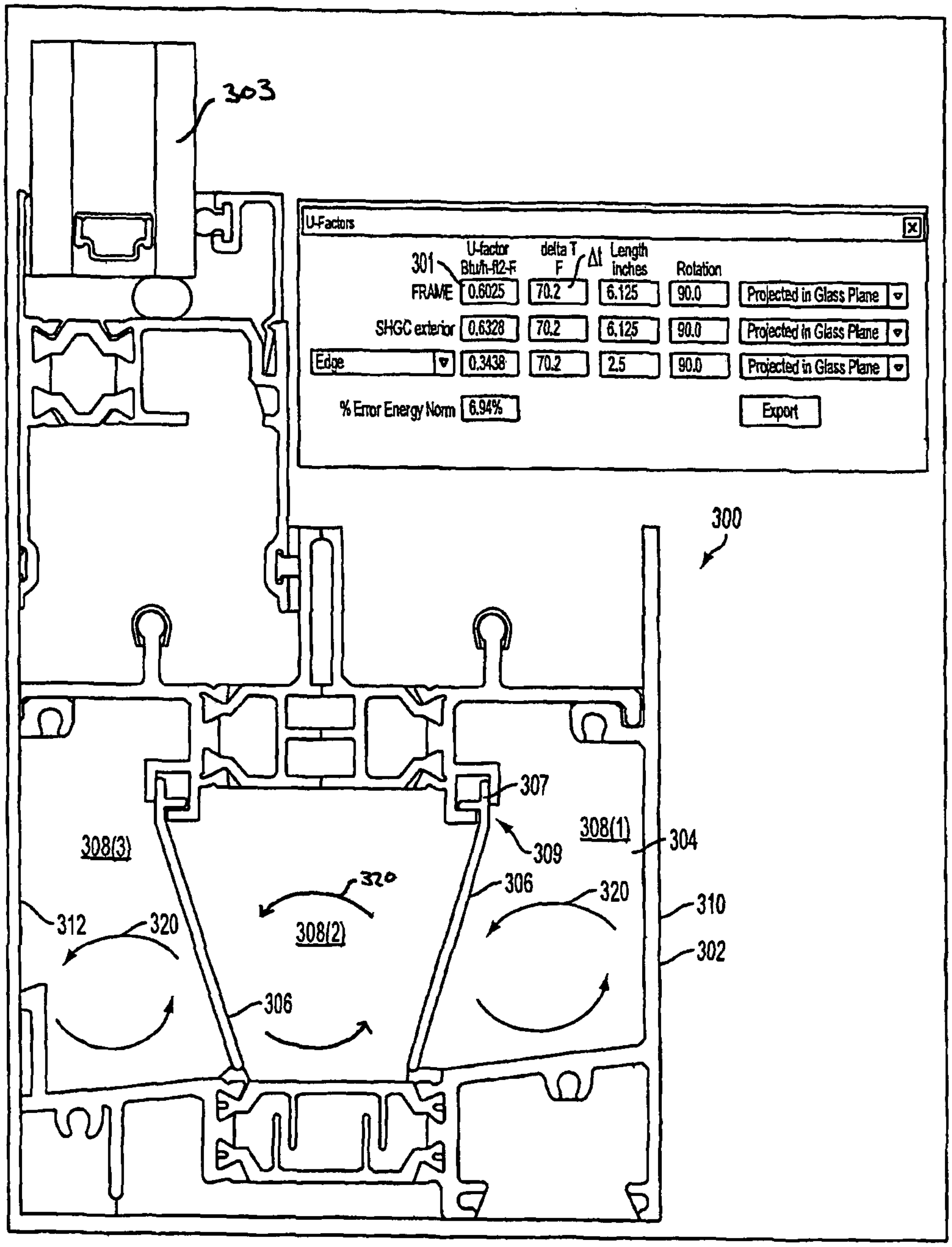
FIG. 3 is a cross-sectional view of a sill assembly including a baffle according to an exemplary embodiment.

FIG. 3 is a cross-sectional view of a sill assembly including a baffle according to an exemplary embodiment. A window assembly 300 includes at least one sill member 302. In various embodiments, the at least one sill member 302 may be constructed from, for example, extruded aluminum or other similar material. The at least one sill member 302 includes a hollow region 304 located therein. At least one baffle 306 is disposed within the hollow region 304. The at least one baffle 306 extends from a top region of the hollow region 304 to a bottom region of the hollow region 304 and divides the hollow region 304 into a plurality of chambers 308(1)-308(3). In various embodiments, the at least one baffle 306 may be constructed from materials such as, for example, rubber, polyvinylchloride (PVC), silicone, generally rigid plastic, or other thermally non-conductive material. In various embodiments, the at least one baffle 306 includes a wedge portion 307. The wedge portion 307 engages a groove 309 formed within the hollow region 304. In a typical embodiment, the groove 309 spans a length of the at least one sill member 302. In various embodiments, the at least one baffle 306 may be integrally formed within the at least one sill member 302. By way of example, two baffles 306 are shown in FIG. 3 dividing the hollow region 304 into three chambers 308 (1)-(3); however, one of ordinary skill in the art will recognize that in various alternative embodiments any number of baffles 306 may be utilized. As illustrated in FIG. 3, the two baffles 308 are angled toward a center of the at least one sill member 302.

Still referring to FIG. 3, a temperature gradient Δt (shown in FIG. 1) arises as a result of a difference between a first temperature $t_1$ (shown in FIG. 1) and a second temperature $t_2$ (shown in FIG. 1). In conditions where there is a large difference between an exterior and an interior temperature, a temperature of air inside the hollow region 304 changes. For example, air that is in close proximity to an interior surface 310 of the at least one sill member 302 may be at a higher temperature while air that is in close proximity to an exterior surface 312 of the at least one sill member 302 may be at a lower temperature. In various embodiments, the exterior surface 312 of the at least one sill member 302 may be at a warmer temperature than the interior surface 310. In such embodiments, air that is close in proximity to the interior surface 310 may be at a lower temperature while air that is close in proximity to the exterior surface 312 may be at a higher temperature. Such heating and cooling of air within the hollow region 304 causes an air density to change in accordance with the ideal gas law resulting in circulation of the air within the hollow region 304 (shown by arrow 320). In a typical embodiment, the at least one baffle 306 extends from a top region of the hollow region 304 to a bottom region of the hollow region 304 and divides the hollow region 304 into the plurality of chambers 308(1)-308(3). Thus, the at least one baffle 306 limits interaction of warmer air and cooler air thereby preventing significant heat transfer via convection across the hollow region 304. This is illustrated in FIG. 3 with arrows 320 showing convective looping within each of the plurality of chambers 308(1)-308(3). In this manner, the at least one baffle 306 provides insulation against thermal energy loss due to convection. By way of example, FIG. 3 illustrates an exemplary temperature gradient Δt of 70.2° F. The arrangement shown in FIG. 3 yields an exemplary U-factor 301 of 0.6025 BTU/hr·ft$^2$·° F.

Figure 4:
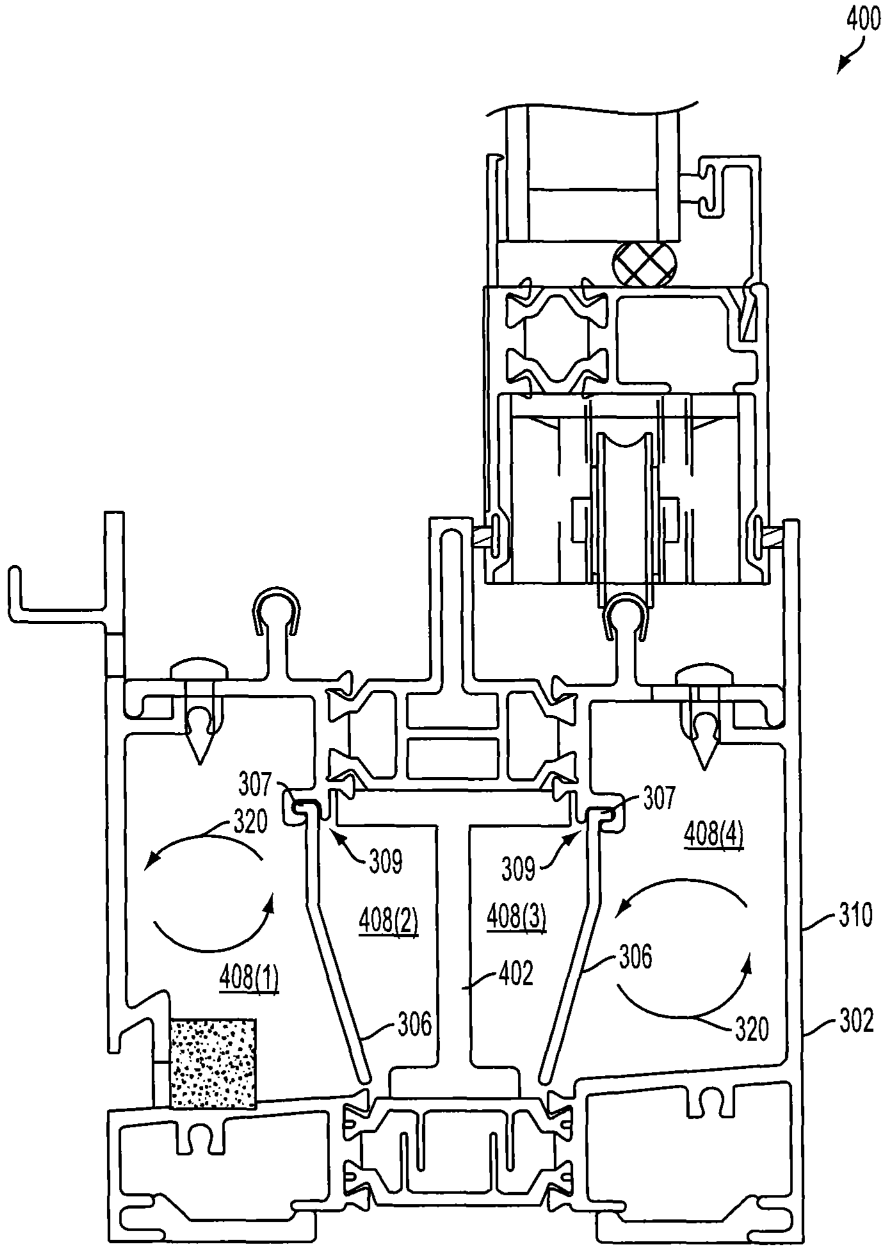
FIG. 4 is a cross-sectional view of a sill assembly including a baffle according to an exemplary embodiment.

FIG. 4 is a cross-sectional view of a sill assembly including a baffle according to an exemplary embodiment. A window assembly 400 is similar in construction to the window assembly 300; however, the window assembly 400 includes a support member 402 disposed in the approximate center of the hollow region 304. In a typical embodiment, the support member 402 may be constructed of, for example, rubber, polyvinylchloride (PVC), silicone, generally rigid plastic, or other thermally non-conductive material. In a typical embodiment, the support member 402 spans a length of the at least one sill member 302; however, in various alternative embodiments, the support member 402 may not extend an entire length of the at least one sill member 302. In various embodiments, the support member 402 is integrally formed with the at least one sill member 302. In a typical embodiment, the support member 402 further divides the hollow region 304 into a plurality of chambers 408(1)-408(4).

Figure 5:
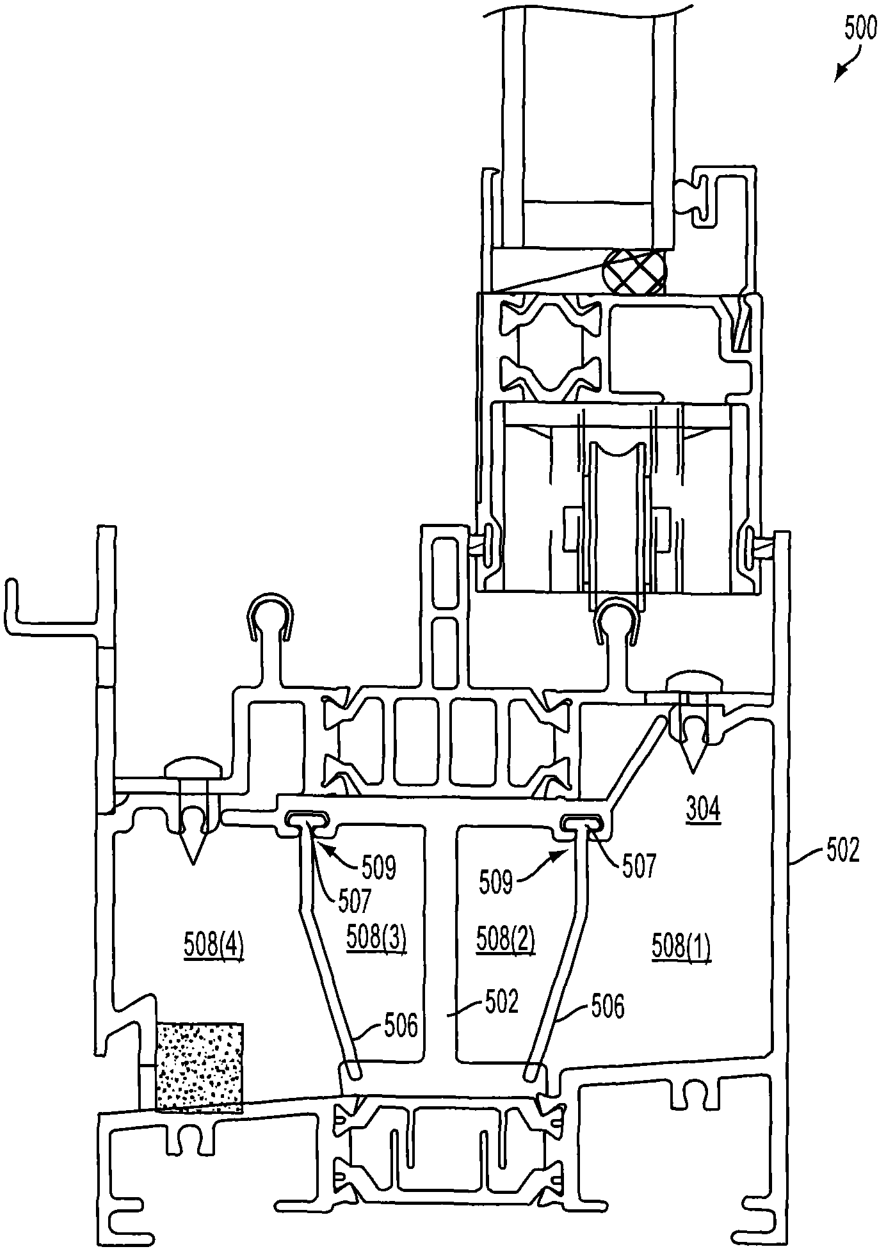
FIG. 5 is a cross-sectional view of a sill assembly including a baffle according to an exemplary embodiment.

FIG. 5 is a cross-sectional view of a sill assembly including a baffle according to an exemplary embodiment. A window assembly 500 is similar in construction to the window assembly 400. The window assembly 500 includes a support member 502 and at least one baffle 506. The at least one baffle 506 includes a wedge portion 507. The wedge portion engages a groove 509 formed in the support member 502. Thus, the support member 502 and the at least one baffle 506 may be inserted and removed from the hollow region 304 as an integral unit. In a typical embodiment, the support member 502 and the at least one baffle 506 are constructed of for example, rubber, polyvinylchloride (PVC), silicone, or other thermally non-conductive material. In a typical embodiment, the support member 502 and the at least one baffle 506 extend an entire length of the at least one sill member 302; however, in alternative embodiments, the support member 502 does not extend an entire length of the at least one sill member 302. The support member 502 further divides the hollow region 304 into a plurality of chambers 508(1)-508(4).

Figure 6:
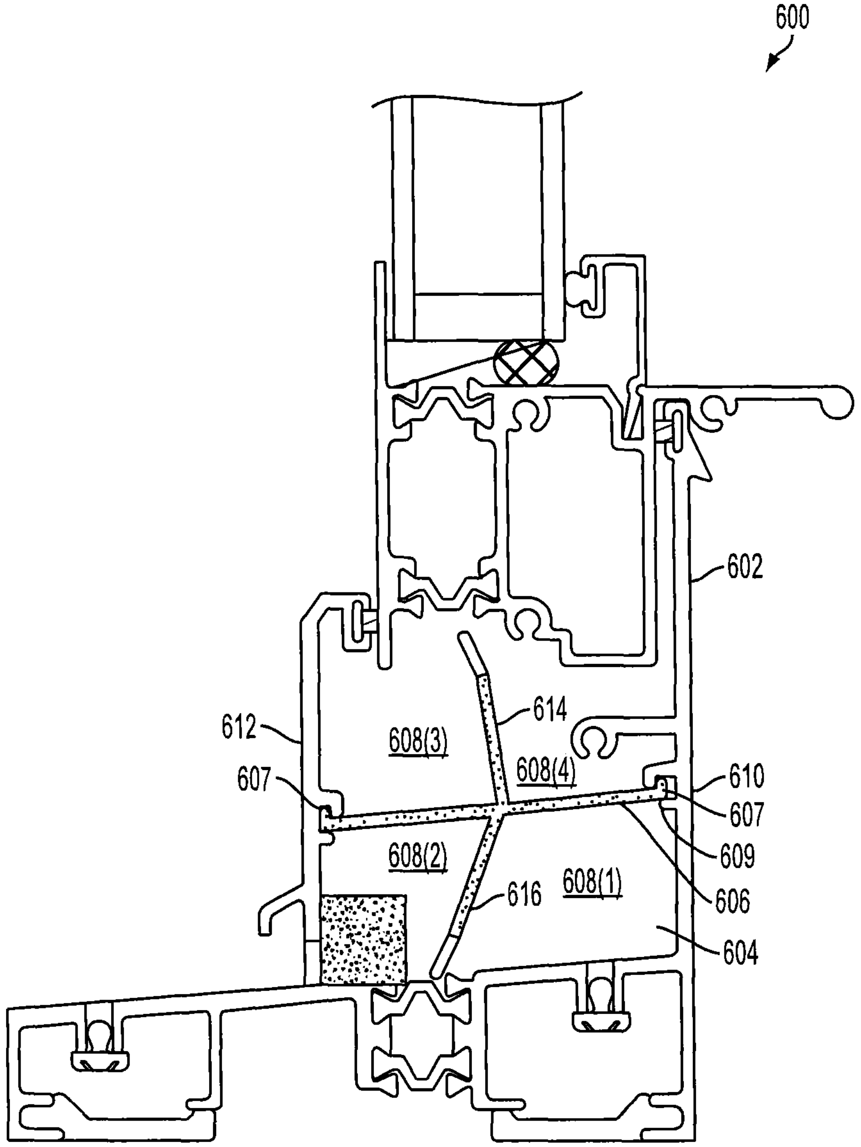
FIG. 6 is a cross-sectional view of a sill assembly including a baffle according to an exemplary embodiment.

FIG. 6 is a cross-sectional diagram of a sill assembly including a baffle according to an exemplary embodiment. A window assembly 600 includes at least one sill member 602. In various embodiments, the at least one sill member 602 may be constructed from, for example, extruded aluminum, fiberglass, or other thermally non-conductive material. The at least one sill member 602 has a hollow region 604 located therein. At least one baffle 606 is disposed within the hollow region 604. The at least one baffle 606 extends from an interior surface 610 of the hollow region 604 to an exterior surface 612 of the hollow region 604. The at least one baffle 606 includes a first finger 614 projecting from a top of the at least one baffle 606 and a second finger 616 projecting from a bottom of the at least one baffle 606. The first finger 614 extends from the at least one baffle 606 to a top region of the hollow region 604. The second finger 616 extends from the at least one baffle 606 to a bottom region of the hollow region 604. In a typical embodiment, combination of the at least one baffle 606, the first finger 614, and the second finger 616 divides the hollow region 604 into a plurality of chambers 608(1)-608(4).

Still referring to FIG. 6, in various embodiments, the at least one baffle 606 may be constructed from materials such as, for example, rubber, polyvinylchloride (PVC), or other thermally non-conductive material. In various embodiments, the at least one baffle 606 includes wedge portions 607. The wedge portions 607 engage grooves 609 formed within the hollow region 604. In a typical embodiment, the grooves 609 span a length of the at least one sill member 602. In other embodiments, the at least one baffle 606, the first finger 614, and the second finger 616 may be integrally formed within the at least one sill member 602. By way of example, the hollow region 604 is shown in FIG. 6 as being divided into four chambers 608; however, one skilled in the art will recognize that any number or combination of the at least one baffle 606, the first finger 614, and the second finger 616 could be used to divide the hollow region 604 into any number of chambers 608.

Still referring to FIG. 6, during operation, the at least one baffle 606 disrupts formation of convective currents or convective looping within the hollow region 604. Without convective looping, heat transfer across the at least one sill member 602 via convection is reduced. Thus, placement of the at least one baffle 606 provides insulation against loss of thermal energy due to convection.

Figure 7:
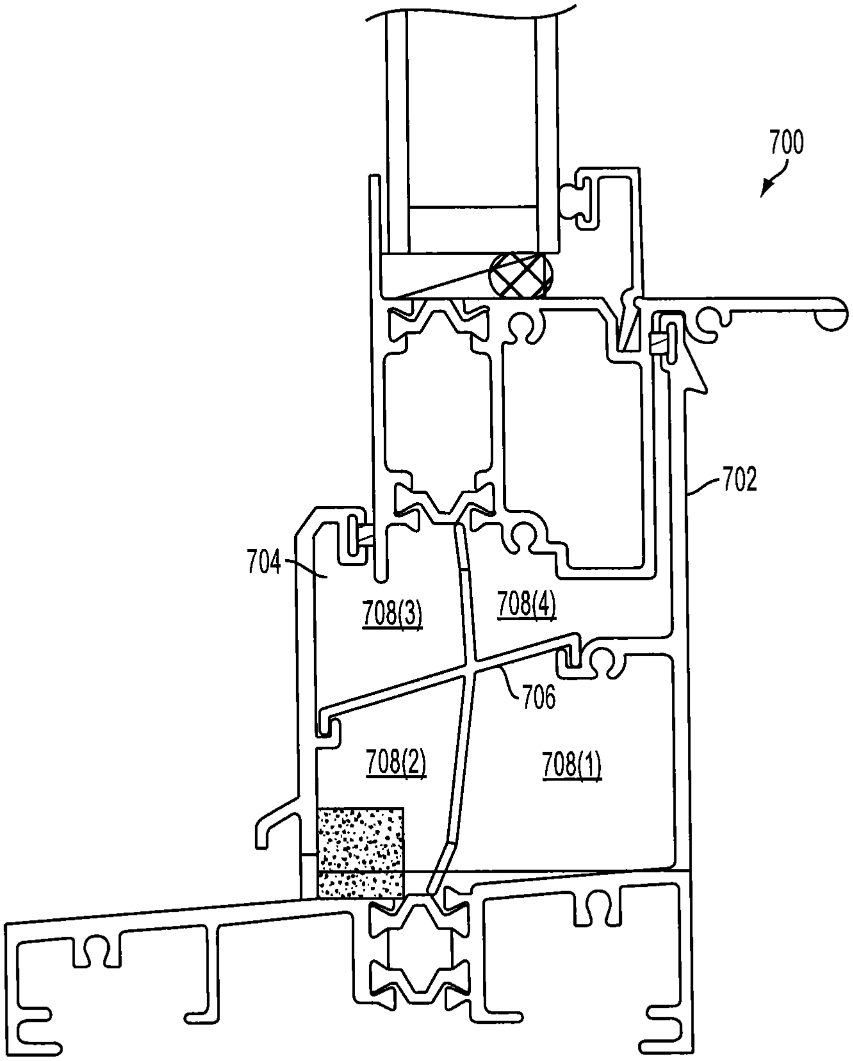
FIG. 7 is a cross-sectional view of a sill assembly including a baffle according to an exemplary embodiment.

FIG. 7 is a cross-sectional view of a sill assembly including a baffle according to an exemplary embodiment. A window assembly 700 includes at least one sill member 702. In various embodiments, the at least one sill member 702 may be constructed from, for example, extruded aluminum, fiberglass, or other thermally non-conductive material. The at least one sill member 702 has a hollow region 704 located therein. At least one baffle 706 is disposed within the hollow region 704. The at least one baffle 706 is similar in construction to the at least one baffle 606 (shown in FIG. 6). In a typical embodiment, the baffle 706 divides the hollow region 704 into a plurality of unequally-sized chambers 708(1)-708(4).

Figure 8:
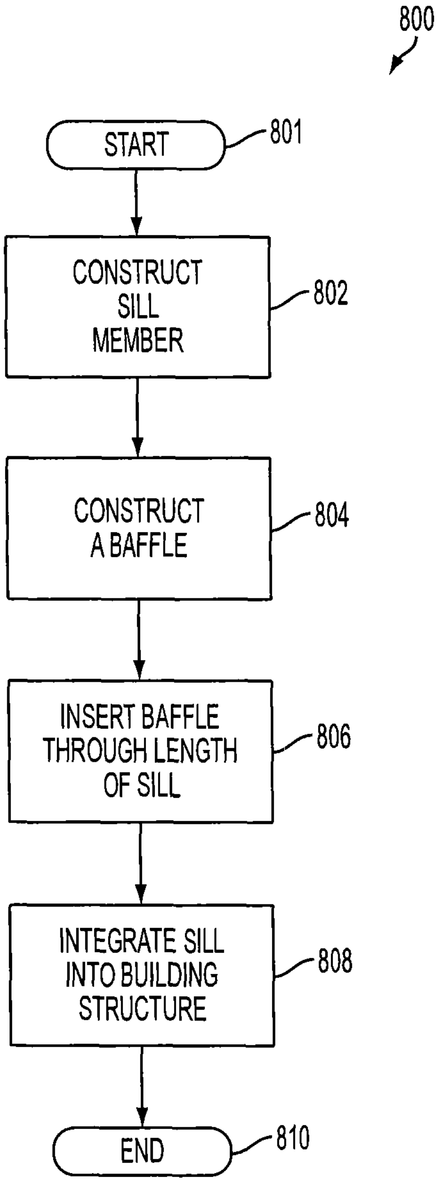
FIG. 8 is a flow diagram of a process for insulating a sill member according to an exemplary embodiment.

FIG. 8 is a flow diagram of a process for insulating a sill member according to an exemplary embodiment. A process 800 begins at step 801. At step 802, at least one sill member having a hollow region is constructed. At step 804, at least one baffle is constructed. At step 806, the at least one baffle is inserted through a length of the hollow region of the at least one sill member. At step 808, the at least one sill member is integrated into a building. The process 800 ends at step 810.

Although various embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein. For example, although the present invention has primarily been described herein as insulating against loss of thermal energy from an interior region of a building to an exterior region; one skilled in the art will recognize that the present invention could also be used to prevent the infiltration of thermal energy from an exterior region into an interior region of a building. This would arise in cases where the interior region of the building is cooler than the exterior region. Next, although the present invention has been primarily described herein as insulating sill members associated with windows, one skilled in the art will recognize that the principles of the present invention could be used to insulate a variety of building structures such as, for example, walls, roofs, doors, vents, skylights, curtain walls, and any other building components having a fluid-filled cavity. The embodiments described herein should be taken as illustrative only.

What is claimed is:

1. A sill assembly comprising:

at least one sill member constructed of a first material, the sill member defining a hollow region;

a first baffle slidably coupled to an upper aspect of the at least one sill member and disconnected from a lower aspect of the at least one sill member, the first baffle being constructed of a second material, the first baffle being angled toward a center of the at least one sill member;

a second baffle slidably coupled to the upper aspect of the at least one sill member and disconnected from a lower aspect of the at least one sill member, independent of the first baffle such that the second baffle is not in direct contact with the first baffle, the second baffle being constructed of the second material, the second baffle being angled toward the center of the at least one sill member;

a support member disposed within the at least one sill member between the first baffle and the second baffle, the support member extends from a top edge of the at least one sill member to a bottom edge of the at least one sill member, the support member being constructed of the second material, the support member comprising a first horizontal member disposed against the top edge of the at least one sill member, a second horizontal member disposed against a bottom edge of the at least one sill member, and a vertical web connecting the first horizontal member and the second horizontal member, the first horizontal member having a length greater than the second horizontal member;

a plurality of chambers formed in the hollow region, the plurality of chambers being defined by the first baffle, the second baffle, and the sill member limiting interaction of warmer air and cooler air within the at least one sill member; and wherein the first baffle and the second baffle reduce heat transfer via convection through the hollow region.

2. The sill assembly of claim 1, wherein the plurality of chambers comprises three or more chambers.

3. The sill assembly of claim 1, wherein at least one of the first baffle and the second baffle is constructed from at least one of rubber, polyvinylchloride, silicone, or rigid plastic.

4. The sill assembly of claim 1, wherein the at least one sill member is a component of a window.

5. The sill assembly of claim 1, wherein the at least one sill member is a component of a door.

6. The sill assembly of claim 1, wherein at least one of the first baffle and the second baffle spans a length of the at least one sill member.

7. The sill assembly of claim 1, wherein the at least one sill member comprises a first groove and a second groove.

8. The sill assembly of claim 7, wherein the first baffle and the second baffle are received in the first groove and the second groove, respectively.

9. A method for insulating a sill member, the method comprising:

providing at least one sill member having a first groove and a second groove disposed within an upper aspect of a hollow region thereof, the at least one sill member constructed of a first material, the first groove and the second groove being offset from a centerline of the at least one sill member on respective sides of the at least one sill member;

providing a first baffle and a second baffle, the first baffle and the second baffle being sized to be disposed within the hollow region, the first baffle and the second baffle being constructed of a second material;

inserting the first baffle into the first groove, such that the first baffle remains disconnected from a lower aspect of the at least one sill member and the first baffle is angled toward the centerline of the at least one sill member;

inserting the second baffle into the second groove independent of the first baffle such that the second baffle remains disconnected from a lower aspect of the at least one sill member and the first baffle is not in direct contact with the first baffle, and the second baffle is angled toward the centerline of the at least one sill member;

inserting a support member within the at least one sill member between the first baffle and the second baffle such that the support member extends from a top edge of the at least one sill member to a bottom edge of the at least one sill member, the support member being constructed of the second material, the support member comprising a first horizontal member disposed against the top edge of the at least one sill member, a second horizontal member disposed against a bottom edge of the at least one sill member, and a vertical web connecting the first horizontal member and the second horizontal member, the first horizontal member having a length greater than the second horizontal member; and arranging the first baffle and the second baffle such that the hollow region of the at least one sill member is divided into a plurality of chambers.

10. The method of claim 9, wherein at least one of the first baffle and the second baffle is constructed from at least one of rubber, polyvinylchloride, silicone, or rigid plastic.

11. The method of claim 9, wherein the plurality of chambers comprises three or more chambers.

12. The method of claim 9, wherein the at least one sill member is a component of a window.

13. The method of claim 9, wherein the at least one sill member is a component of a door.

14. The method of claim 9, wherein at least one of the first baffle and the second baffle spans a length of the at least one sill member.

* * * * *